United States Patent
Chen et al.

(10) Patent No.: US 11,921,001 B2
(45) Date of Patent: Mar. 5, 2024

(54) SYSTEM FOR INSPECTING DEVIATION IN DYNAMIC CHARACTERISTICS OF LINEAR TRANSMISSION DEVICE OF FEEDING SYSTEM

(71) Applicant: Hiwin Technologies Corp., Taichung (TW)

(72) Inventors: Hsien-Yu Chen, Taichung (TW); Yu-Sheng Chiu, Taichung (TW); Chih-Chun Cheng, Taichung (TW); Wen-Nan Cheng, Taichung (TW); Chi-Ming Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 17/654,432

(22) Filed: Mar. 11, 2022

(65) Prior Publication Data
US 2023/0288290 A1    Sep. 14, 2023

(51) Int. Cl.
*G01M 13/00* (2019.01)
*G01M 5/00* (2006.01)
*G05B 23/02* (2006.01)

(52) U.S. Cl.
CPC .......... *G01M 13/00* (2013.01); *G01M 5/0066* (2013.01); *G05B 23/0256* (2013.01)

(58) Field of Classification Search
CPC .. G01M 13/00; G01M 5/0066; G05B 23/0256
See application file for complete search history.

(56) References Cited

U.S. PATENT DOCUMENTS

| | | | | |
|---|---|---|---|---|
| 11,409,249 | B1 * | 8/2022 | Udengaard | .......... G05B 13/042 |
| 2003/0080489 | A1 * | 5/2003 | Huang | ............... H04N 1/00063 |
| | | | | 271/3.17 |

(Continued)

FOREIGN PATENT DOCUMENTS

| | | |
|---|---|---|
| CN | 112446104 A | 3/2021 |
| WO | 2020053083 A1 | 3/2020 |

OTHER PUBLICATIONS

Li et al. ( Direct way of computing the variability of modal assurance criteria, Wang School of Mechanical Science and Engineering, Huazhong University of Science and Technology, Wuhan 430074, China—Nov. 2013) (Year: 2013).*

*Primary Examiner* — Mohamed Charioui
*Assistant Examiner* — Christine Y Liao
(74) *Attorney, Agent, or Firm* — Wang Law Firm, Inc.

(57) ABSTRACT

A method and system for inspecting deviation in dynamic characteristics of a feeding system are provided, and the method includes: exciting the feeding system and detecting vibrations of a subcomponent of a component to be inspected of the feeding system to generate a monitoring excitation signal in a monitoring mode; calculating, by a modal analysis method, monitoring eigenvalues and monitoring eigenvectors of the monitoring excitation signal; determining, by a modal verification method, similarity between the monitoring eigenvalues and standard eigenvalues of a digital twin model and similarity between the monitoring eigenvectors and standard eigenvectors of the digital twin model; determining that the dynamic characteristics of the subcomponent are deviated, when the monitoring eigenvalues and monitoring eigenvectors are not similar to the standard eigenvalues and standard eigenvectors. Therefore, the subcomponent whose dynamic characteristics are deviated can be sensed remotely and precisely.

7 Claims, 6 Drawing Sheets

(56) References Cited

U.S. PATENT DOCUMENTS

2008/0294354 A1\* 11/2008 Zhu .................. G01H 13/00
   702/56
2019/0162704 A1\* 5/2019 Cheng ................ G01N 29/14
2021/0123830 A1 4/2021 Cheng et al.

\* cited by examiner

SYSTEM FOR INSPECTING DEVIATION IN DYNAMIC CHARACTERISTICS OF LINEAR TRANSMISSION DEVICE OF FEEDING SYSTEM

BACKGROUND

Field of the Invention

The present invention relates to a status inspecting system, and more particularly to a method and a system for inspecting deviation in dynamic characteristics of a feeding system.

Description of Related Art

In precision machinery manufacturing, the optimization of production machines is particularly important. Therefore, for example, the published patent WO2020053083A1 provides a technique where a digital twin model of a machine is utilized to adjust and control the internal data of the machine controller to optimize the machine. However, this technique can only read processing-related data of the equipment but cannot diagnose whether or not any components in the equipment are abnormal.

The published patent CN112446104A provides a method for identifying the deviation between an automated apparatus and its digital twin. In this method, a sensor installed on a process material to monitor parameters, such as temperature, speed, acceleration, and then the detected result of the sensor is compared with the digital twin data that is simulated in advance. When the detected result of the sensor is different from the simulated values, the abnormal station for this workpiece in the automation apparatus can be identified. However, this method cannot grasp the cause of the abnormality and whether the system dynamic characteristic of a certain transmission element has deteriorated.

The published patent US20210123830 provides a method for monitoring the health of machine tools. In this method, the data collected by sensors is utilized to establish a cluster of health characteristics (including displacement transfer rate, natural frequency, etc.) while the production equipment is excited, and this cluster serves as the basis for judging the machine's health status. However, this method still cannot accurately know which part of the machine is abnormal, and has poor sensitivity.

Since it is impossible to monitor the status changes of the various components of the machine in real time, it is usually only when the finished product size is poor or the machine makes abnormal noises that the machine is found abnormal, and then the operational modal analysis (OMA) technology can be used to test out which part of the machine is abnormal. Not only is it time-consuming and laborious, but the experimental data is also not universal.

SUMMARY

Accordingly, one objective of the present invention is to provide a method and a system for inspecting deviation in dynamic characteristics of a feeding system, whereby a supervisor is allowed to remotely monitor the changes in dynamic characteristics of key components (i.e., subcomponents) in the feeding system.

Another objective of the present invention is to provide a method and a system for inspecting deviation in dynamic characteristics of a feeding system, whereby the supervisor is allowed to know in real time whether the dynamic characteristics of each key component are deviated or abnormal, so that the abnormal key components can be appropriately treated in real time.

Yet another objective of the present invention is to provide a method and a system for inspecting deviation in dynamic characteristics of a feeding system, whereby abnormal key components can be sensed quickly, thereby shortening the time for removing obstacles that make the production line's downtime.

A further objective of the present invention is to provide a method and a system for inspecting deviation in dynamic characteristics of a feeding system, whereby a standard digital twin model corresponding to a component to be inspected can be applicable to the feeding systems of different specifications.

To achieve the above objectives and other objectives, the present invention provides a method for inspecting deviation in dynamic characteristics of a feeding system, the feeding system includes at least one component to be inspected, said respective component to be inspected includes at least one subcomponent, and the method for inspecting deviation in dynamic characteristics of the feeding system is performed by a processor and includes the following steps of: (A) installing a detector, which is communicable to the processor, on the subcomponent; (B) exciting the feeding system in a monitoring mode, and detecting vibration of the subcomponent through the detector to generate a monitoring excitation signal; (C) calculating a set of monitoring eigenvalues and a set of monitoring eigenvectors of the monitoring excitation signal by a modal analysis method; (D) determining, by a modal verification method, similarity between the set of monitoring eigenvalues corresponding to the detector and a set of standard eigenvalues and similarity between the set of monitoring eigenvectors corresponding to the detector and a set of standard eigenvectors, and the set of standard eigenvalues and the set of standard eigenvectors being standard dynamic characteristics of a digital twin model established for the at least one component to be inspected; and (E) determining that the dynamic characteristics of the subcomponent corresponding to the detector are deviated, when the set of monitoring eigenvalues and the set of monitoring eigenvectors corresponding to the detector are not similar to the set of standard eigenvalues and the set of standard eigenvectors, respectively.

In some embodiments, the digital twin model includes a set of first initial eigenvalues and a set of first initial eigenvectors, the set of first initial eigenvalues and the set of first initial eigenvectors are generated when the digital twin model is established for the at least one component to be inspected that has not been installed in the feeding system yet, and the set of standard eigenvalues and the set of standard eigenvectors of the digital twin model are generated by the following steps of: (F) exciting the feeding system in an initial mode, and detecting, by the detector, the vibration of the corresponding subcomponent to generate an initial excitation signal, and the initial mode being a stage the at least component to be inspected that is new one is assembled to the feeding system before the feeding system enters the monitoring mode; (G) calculating, by the modal analysis method, a set of second initial eigenvalues and a set of second initial eigenvectors of the initial excitation signal; and (H) estimating, by an optimization method, the set of standard eigenvalues and the set of standard eigenvectors corresponding to the detector, according to the set of first initial eigenvalues, the set of first initial eigenvectors, the set of second initial eigenvalues and the set of second initial eigenvectors corresponding to the detector.

In some embodiments, the step (H) is performed by the following formula:

$$\min\left[\left(\frac{\hat{\omega}_n - \omega_n}{\omega_n}\right)^2 + (\Delta MAC_n)\right] \to 0$$

wherein $\hat{\omega}_n$ is a $n^{th}$ first initial eigenvalue in the set of first initial eigenvalues; $\omega_n$ is a $n^{th}$ second initial eigenvalue in the set of second initial eigenvalues; and $\Delta MAC_n$ is similarity between the $n^{th}$ first initial eigenvector in the set of first initial eigenvectors and the $n^{th}$ second initial eigenvector in the set of second initial eigenvectors and is calculated by a modal reliability criterion, and n is a positive integer.

In some embodiments, the method for inspecting the deviation in the dynamic characteristics of the feeding system further includes the following steps: (I) determining whether the set of monitoring eigenvalues is smaller than a monitoring threshold; and (J) determining that the subcomponent corresponding to the detector is abnormal when the set of monitoring eigenvalues is less than the monitoring threshold.

In some embodiments, when it is determined that the set of monitoring eigenvalues and the set of monitoring eigenvectors are not similar to the set of standard eigenvalues and the set of standard eigenvectors, respectively, the method for inspecting the deviation in the dynamic characteristics of the feeding system further includes the following steps: (K) updating, by an optimization method, the set of standard eigenvalues and the set of standard eigenvectors according to the set of monitoring eigenvalues and the set of monitoring eigenvectors, and defining the updated set of standard eigenvalues and the updated set of standard eigenvectors as updated dynamic characteristics of the digital twin model.

In some embodiments, the modal analysis method is an experimental modal analysis method or an operational modal analysis method.

In some embodiments, the feeding system is excited in a knock or motor-driven manner.

In some embodiments, the dynamic characteristic of the subcomponent include mass, damping or rigidity.

In some embodiments, the component to be inspected is a linear guideway or a ball screw; when the component to be inspected is the linear guideway, the subcomponent is a rail or a slider; and when the component to be inspected is the ball screw, the sub-component is a screw rod or a nut.

An embodiment of the present invention further provides a system for inspecting deviation in dynamic characteristics of a feeding system, the system includes a processor, and the processor is configured to perform the abovementioned method for inspecting the deviation in the dynamic characteristics of the feeding system.

BRIEF DESCRIPTION OF THE DRAWINGS

After studying the detailed description in conjunction with the following drawings, other aspects and advantages of the present invention will be discovered.

DETAILED DESCRIPTION

In the following detailed description, many specific details are explained in order to provide a thorough understanding of the present invention. However, those of ordinary skill in the art will understand that the present invention can be practiced without these specific details. In other cases, well-known methods, procedures and/or elements have not been described in detail so as not to obscure the present invention.

Please refer to FIG. 1 to FIG. 5, a system 1 for inspecting deviation in dynamic characteristics of a feeding system 2 according to an embodiment of the present invention can be applied to perform a method for inspecting the deviation in the dynamic characteristics of the feeding system 2. The feeding system 2 includes at least one linear module 21, and each linear module 21 includes a plurality of components, such as but not limited to including a work platform 22 and at least one linear transmission device. In the embodiment shown in FIG. 4, the number of linear transmission devices is three, namely a ball screw 23 and two linear guideways 24; the ball screw 23 includes a plurality of subcomponents, namely a screw rod 231 and a nut 232 movably sleeved on the screw rod 231; and each linear guideway 24 includes a plurality of subcomponents, namely, a rail 241 and two sliders 242 installed on the work platform 22 and movably sleeved on the rail 241. Each component has its own dynamic characteristics, such as but not limited to mass, damping and rigidity. In this embodiment, an example in which two linear guideways 24 are used as the components to be inspected to confirm the rigidity deviation of the four sliders 242 will be described.

Figure 1:
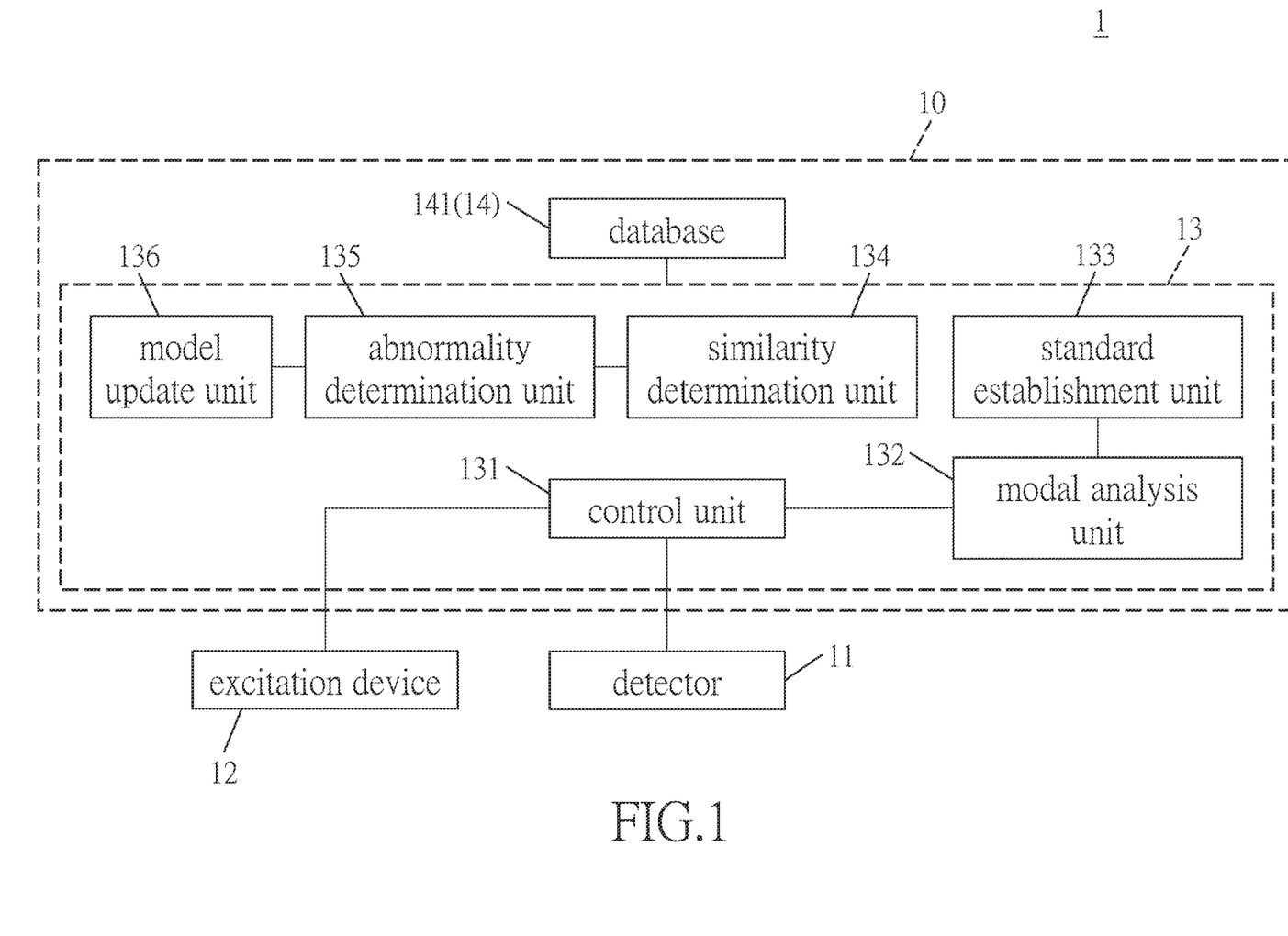
FIG. 1 is a functional block diagram of a system for inspecting deviation in dynamic characteristics of a feeding system according to an embodiment of the present invention.

The system 1 may include, for example, but not limited to, a server 10, at least one detector 11, and an excitation device 12. The server 10 includes a processor 13 and a memory 14 electrically connected to the processor 13.

The server 10 is provided with a plurality of software applications, so the processor 13 and the memory 14 can be configured under the related software's operation to include a control unit 131, a modal analysis unit 132, a standard establishment unit 133, and a similarity determination unit 134, an abnormality determination unit 135, a model update unit 136, and a database 141. The control unit 131 can communicate with the modal analysis unit 132, the modal analysis unit 132 can communicate with the standard establishment unit 133, the similarity determination unit 134 can communicate with the abnormality determination unit 135, the abnormality determination unit 135 can communicate with the model update unit 136, and these units can communicate with the database 141 to access the database 141. The control unit 131 also communicates with the detector 11 and the excitation device 12 to control the operation of the detector 11 and the excitation device 12.

The database 141 can store, for example, but not limited to, algorithms, thresholds, and data on various correlations. Various correlations can be, for example, but not limited to, the correlation between rigidity value and natural frequency, the correlation between material and density, the correlation between material and Young's modulus, and the correlation between the detector 11 and the subcomponent of an object (or component) to be inspected on which the detector 11 is located. The database 141 can also store related data of each component, such as but not limited to size data, material data, position data, preset rigidity values and correlations thereof. The size data can be created or set when drawing a 3D component image of a component through, for example, but not limited to, a drawing software application (such as but not limited to AutoCAD) installed in the system 1 is done. The position data can be obtained by, for example, but not limited to, sampling the pixel coordinates of the 3D component image through the finite element method (FEM) or the continuum mechanics. The position data is also associated with the relative position of this component with respect to other components in the feeding system 2.

Figure 4:
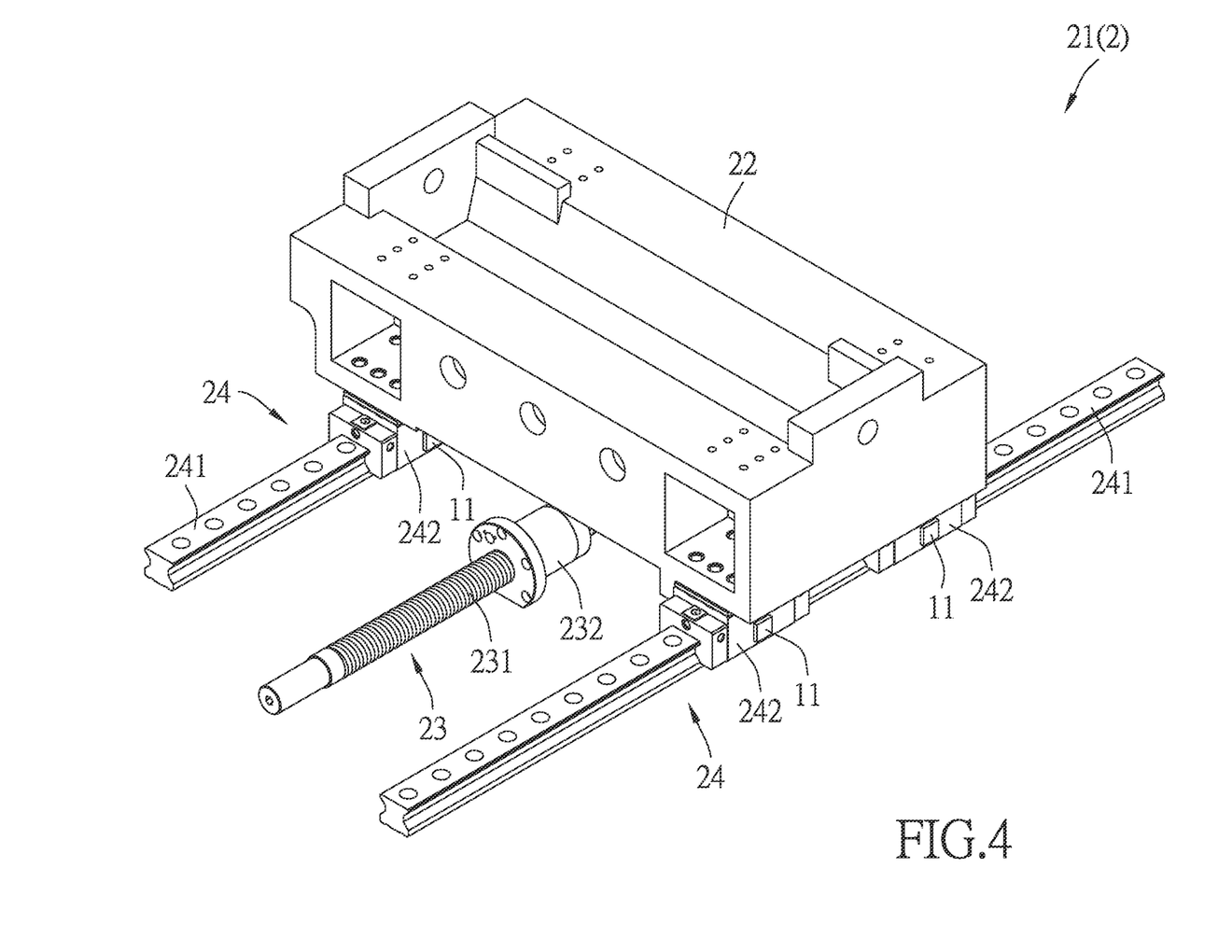
FIG. 4 is an illustrative view showing detectors installed on a feeding system at a viewing angle according to an embodiment of the present invention.

In this embodiment, in order to detect the rigidity deviation of the sliders 242A-242D, the number of detectors 11 can be set to 4, namely the detectors 11A-11D, and they are respectively disposed to the sliders 242A-242D on the bottom surface of the work platform 22, as shown in FIG. 4. However, the present invention is not limited to this implementation mode. The detector 11 is configured to detect the vibration of the work platform 22 by detecting the vibrations of the sliders 242A-242D, and may be, for example, but not limited to, an accelerometer. The excitation device 12 is configured to excite the feeding system 2 so that the work platform 22 is vibrated by an external force. The excitation device 12 may excite the feeding system 2 in, for example, but not be limited to, a knock or motor-driven manner.

The following example illustrates the method of inspecting the rigidity deviation of the two linear guideways 24. In this detection method, the processor 13 first enters an initial mode to establish the standard of virtual dynamic characteristics, and then enters a monitoring mode to regularly or irregularly monitor whether the dynamic characteristics of the sliders 242A to 242D after starting to work are deviated or abnormal, according to this standard. The initial mode is the stage where the two linear guideways 24 (that is, the components to be inspected) that have just been shipped from the factory (i.e., that is new one) are assembled in the feeding system 2 that has not entered the monitoring mode yet. The monitoring mode is the stage where the feeding system 2 that has been finished assembling has started to work and needs to be monitored.

Figure 2:
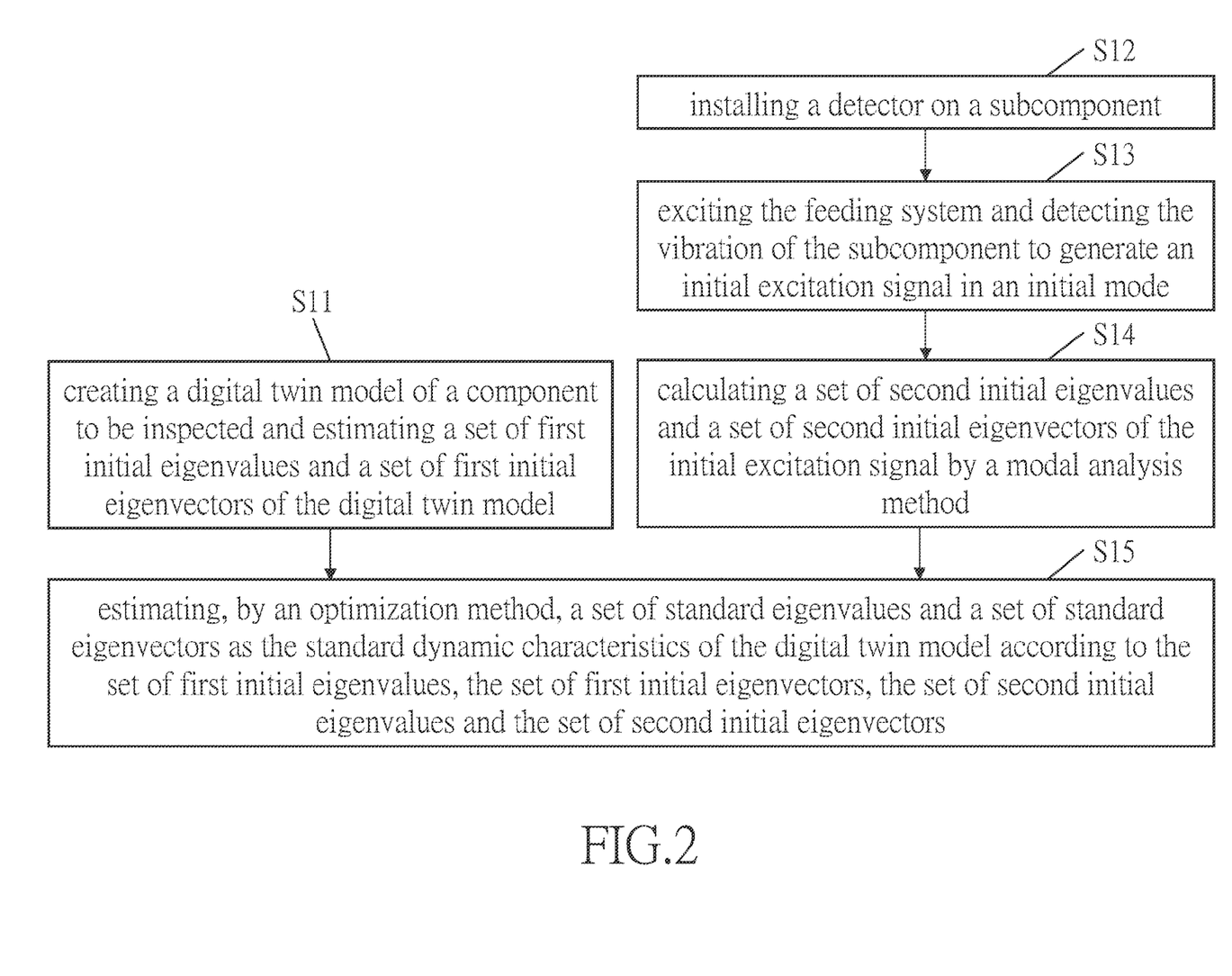
FIG. 2 is a flowchart of a method for establishing standard dynamic characteristics of a digital twin model in an initial mode according to an embodiment of the present invention.

Please refer to FIGS. 1 and 2 together. In the initial mode, the method of establishing the standard of virtual dynamic characteristics may include, for example, but not be limited to, the following steps.

First, in step S11, since the sliders 242A-242D of the two linear guideways 24 are fixed to a bottom surface of the work platform 22, and the sliders' preload has different degrees of influence on the vibration mode of the feeding structure (the two linear guideways 24 and the work platform 22 as well), so the modal analysis unit 132 can select the work platform 22, over which the sliders 242A-242D are distributed, as the reference target for establishing the digital twin model, and obtain size data (such as but not limited to length, width, and height), material data and position data of the work platform 22 and the rigidity value range of the slider 242 from the database 141, and can, based on these data, by using software (such as but not limited to computer aided engineering (CAE) software (such as but not limited to the analysis software launched by ANSYS)) stored in the memory 14, create a digital twin model of the work platform 22 for the two linear guideways 24 that have not been installed in the feeding system 2 yet, and calculate a set of first initial eigenvalues and a set of first initial eigenvectors as the initial dynamic characteristics of this digital twin model. The first initial eigenvalues are the initial natural frequencies of the digital twin model, and the first initial eigenvectors are the initial modes of the digital twin model. The digital twin model at this time is the initial digital twin model that has not been calibrated yet, so its initial dynamic characteristics are slightly different from the real dynamic characteristics of the two linear guideways 24 that have been installed in the feeding system 2. The initial digital twin model and its initial dynamic characteristics will be stored in the database 141 for use in subsequent searches.

Figure 5:
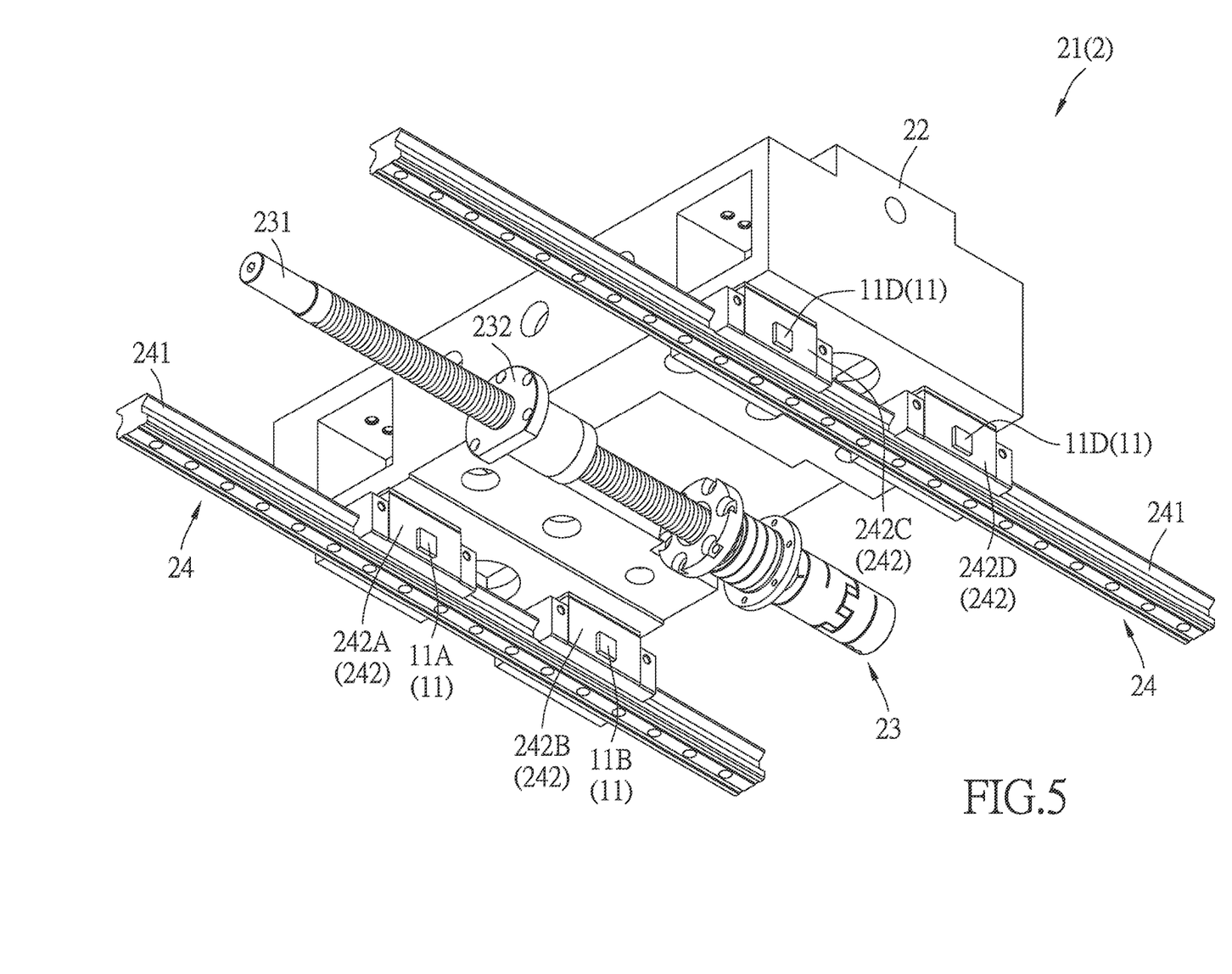
FIG. 5 is an illustrative view showing detectors installed a feeding system at another viewing angle according to an embodiment of the present invention.

On the other hand, in step S12, the detectors 11A to 11D can be installed on the sliders 242A to 242D, respectively, as shown in FIGS. 4 and 5.

Next, in step 13, in the initial mode, the control unit 131 controls the excitation device 12 to excite the feeding system 2 stopping working, to vibrate the sliders 242A to 242D. At the same time, the control unit 131 also controls the four detectors 11 to detect the vibrations of the sliders 242A to 242D. The four detectors 11 will correspondingly generate four initial excitation signals, which will be sent back to the control unit 131.

Then, in step S14, the control unit 131 provides the four initial excitation signals to the modal analysis unit 132, and the modal analysis unit 132 uses the software (such as, but not limited to CAE software) stored in the memory 14, based on a modal analysis method, to convert each initial excitation signal from a time domain signal into a frequency domain signal through fast Fourier transform (FFT), so as to calculate a set of second initial eigenvalues and a set of second initial eigenvectors of each initial excitation signal. The second initial eigenvalues and the second initial eigenvectors are the real natural frequencies and the real modes of the work platform 22 that has been installed on the feeding system 2. The modal analysis method may be, for example, but not limited to, an experimental modal analysis method or an operational modal analysis method.

Finally, in step S15, the standard establishment unit 133 obtains the set of second initial eigenvalues and the set of second initial eigenvectors of the initial excitation signal of each detector 11 from the modal analysis unit 132 and the set of first initial eigenvalues and the set of first initial eigenvectors from the database 141, and then according to the set of first initial eigenvalues, the set of first initial eigenvectors and the set of second initial eigenvalues and the set of second initial eigenvectors corresponding to each of the detectors 11, estimates a set of standard eigenvalues and a set of standard eigenvectors corresponding to each detector 11 by an optimization method through the software (such as but not limited to CAE software) stored in the memory 14, and the set of standard eigenvalues and the set of standard eigenvectors corresponding to each detector 11 serve as the standard dynamic characteristics of the digital twin model. The digital twin model at this time is a standard digital twin model that has been calibrated, and its standard dynamic characteristics conform to the real dynamic characteristics of the two linear guideways 24 installed in the feeding system 2. The standard digital twin model and its standard dynamic characteristics will be recorded in the database 141 by the standard establishment unit 133, and the correlations between the standard dynamic characteristics and the four detectors 11 will also be recorded in the database 141 by the standard establishment unit 133 for use in subsequent searches.

The above optimization method can be performed by, for example, but not limited to, the following formula, wherein $\hat{\omega}_n$ is the $n^{th}$ first initial eigenvalue in a set of first initial eigenvalues; $\omega_n$ is the $n^{th}$ second initial eigenvalue in a set of second initial eigenvalues; and $\Delta MAC_n$ is similarity between the $n^{th}$ first initial eigenvector in the set of first initial eigenvectors and the $n^{th}$ second initial eigenvector in the set of second initial eigenvectors, the similarity is calculated by a modal reliability criterion, and n is a positive integer.

$$\min\left[\left(\frac{\hat{\omega}_n - \omega_n}{\omega_n}\right)^2 + (\Delta MAC_n)\right] \to 0$$

Figure 3:
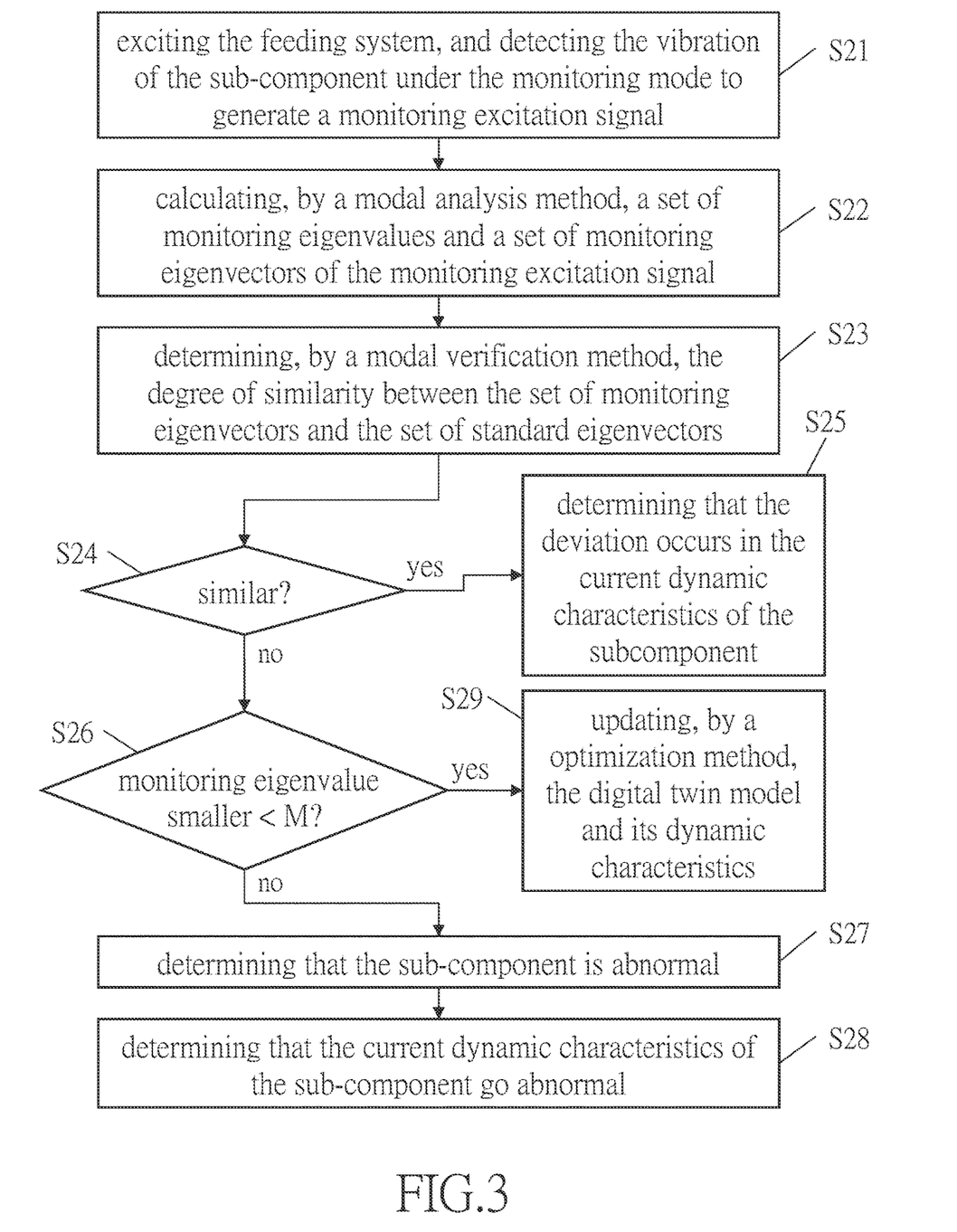
FIG. 3 is a flowchart of a method for monitoring deviation and abnormality of dynamic characteristics in a monitoring mode according to an embodiment of the present invention.

After establishing the standard dynamic characteristics of the digital twin model, the processor 13 can enter the monitoring mode to further monitor the deviation and abnormality of the dynamic characteristics of the sliders 242A to 242D. As shown in FIG. 1 and FIG. 3, in the monitoring mode, the method of monitoring the deviation and abnormality of the dynamic characteristics of the sliders 242A to 242D may include, for example, but not limited to, the following steps.

First, in step S21, in the monitoring mode, the control unit 131 controls the excitation device 12 to excite the feeding system 2 that has stopped working, to vibrate the sliders 242A to 242D. At the same time, the control unit 131 also controls the four detectors 11 to detect the vibrations of the sliders 242A to 242D. The four detectors 11 will correspondingly generate four monitoring excitation signals, which will be sent back to the control unit 131.

Then, in step S22, the control unit 131 can provide the four monitoring excitation signals to the modal analysis unit 132, and the modal analysis unit 132 can use the software (for example but not limited to, CAE software) stored in the memory 14 and use the modal analysis method to covert the monitoring excitation signal corresponding to each of the detectors 11 from a time domain signal to a frequency domain signal through the fast Fourier transform, so as to calculate a set of monitoring eigenvalues and a set of monitoring eigenvectors of the monitoring excitation signal of each detector 11. Moreover, the modal analysis unit 132 may further record the set of monitoring eigenvalues and the set of monitoring eigenvectors corresponding to each detector 11 to the database 141. The modal analysis method may be, for example, but not limited to, an experimental modal analysis method or an operational modal analysis method.

Then, in step S23, the similarity determination unit 134 can obtain the standard dynamic characteristics (that is, the set of monitoring eigenvalues and the set of monitoring eigenvectors corresponding to each detector 11) of the digital twin model from the database 141, and obtain the set of monitoring eigenvalues and the set of monitoring eigenvectors, corresponding to each detector 11 and calculated in the step S22, from the database 141. Moreover, the similarity determination unit 134 can further use the software (such as but not limited to CAE software) stored in the memory 14 and a modal verification method to determine the similarity between the set of standard monitoring eigenvectors and the set of monitoring eigenvectors corresponding to the same detector 11, and determine the similarity between the set of standard monitoring eigenvalues and the set of monitoring eigenvalues corresponding to the same detector 11. The modal verification method may be, for example, but not limited to, a modal reliability criterion.

Taking determining the similarity between a set of standard eigenvectors and a set of monitoring eigenvectors with the modal verification method as an example, the similarity can be calculated by the following formula, wherein MAC (r,q) represents the similarity; $\emptyset_r$ represents the matrix of the set of monitoring eigenvectors; $\emptyset_q$ represents the matrix of the standard eigenvectors; $\emptyset_r^T$ is the transposed matrix of the monitoring eigenvectors; and $\emptyset_q^T$ represents the transposed matrix of the standard eigenvectors.

$$MAC(r, q) = \frac{|\emptyset_r^T \times \emptyset_q|^2}{(\emptyset_r^T \times \emptyset_r) \times (\emptyset_q^T \times \emptyset_q)}$$

Then in step S24, the similarity determination unit 134 further compares the similarity calculated in step S23 with a similarity threshold (such as but not limited to 0.8), to determine whether the set of monitoring eigenvalues and the set of monitoring eigenvectors corresponding to the same detector 11 are respectively similar to the set of standard eigenvalues and the set of standard eigenvectors corresponding to the same detector 11.

In step S24, when the similarity between the set of monitoring eigenvalues and the set of standard eigenvalues corresponding to the same detector 11 is greater than or equal to the similarity threshold, the similarity determination unit 134 determines that the set of monitoring eigenvalues is similar to the set of standard eigenvalues. Similarly, in step S24, when the similarity between the set of monitoring eigenvectors and the set of standard eigenvectors corresponding to the same detector 11 is greater than or equal to the similarity threshold, the similarity determination unit 134 determines that the set of monitoring eigenvectors is similar to the set of standard eigenvectors. Since the database 141 records the correlations between the respective detectors 11 and the respective sliders 242, the similarity determination unit 134 may further in step S25, according to the determination result of step S24, determine that the current rigidity value of the slider 242 corresponding to the detector 11 corresponding to the set of monitoring eigenvectors similar to the set of standard eigenvectors has no deviation, and record this result in the database 141.

Conversely, in step S24, when the similarity between the set of monitoring eigenvalues and the set of standard eigenvalues corresponding to the same detector 11 is less than the similarity threshold, the similarity determination unit 134 determines that the set of monitoring eigenvalues is not similar to the set of standard eigenvalues. Similarly, in step S24, when the similarity between the set of monitoring eigenvectors and the set of standard eigenvectors corresponding to the same detector 11 is less than the similarity threshold, the similarity determination unit 134 determines that the set of monitoring eigenvectors is not similar to the set of standard eigenvectors. At this time, the abnormality determination unit 135 may further obtain a monitoring threshold value M from the database 141 in step S26, and determine whether the set of monitoring eigenvalues that are not similar to the set of standard eigenvalues are smaller than the monitoring threshold value M.

In step S26, if not, it means that the current dynamic characteristics of the slider 242 corresponding to the detector 11 corresponding to the set of monitoring eigenvalues only deviate from the standard, but the deviation is still within the allowable range, so the abnormality determination unit 135 determines in step S27 that the current rigidity value of the slider 242 has a deviation, and records the determination result in the database 141. Then, in step S28, the model update unit 136 uses the software (such as but not limited to CAE software) stored in the memory 14 and an optimization method to according to the set of monitoring eigenvalues and the set of monitoring eigenvectors, update the digital twin model and its virtual dynamic characteristics (that is, the respective sets of standard eigenvalues and the respective sets of standard eigenvectors) that are stored in the database 141, and defines the updated sets of standard eigenvalues and the updated sets of standard eigenvectors as the update dynamic characteristics of the digital twin model.

On the contrary, in step S26, if yes, it means that the current rigidity value of the slider 242 corresponding to the detector 11 corresponding to the set of monitoring eigenvalues not only deviates from the standard, but also the deviation exceeds the allowable range, so the abnormality determination unit 135 determines in step S29 that the current rigidity value of the slider 242 has been abnormal, and accordingly generates an abnormal signal and records the determination result in the database 141.

Figure 6:
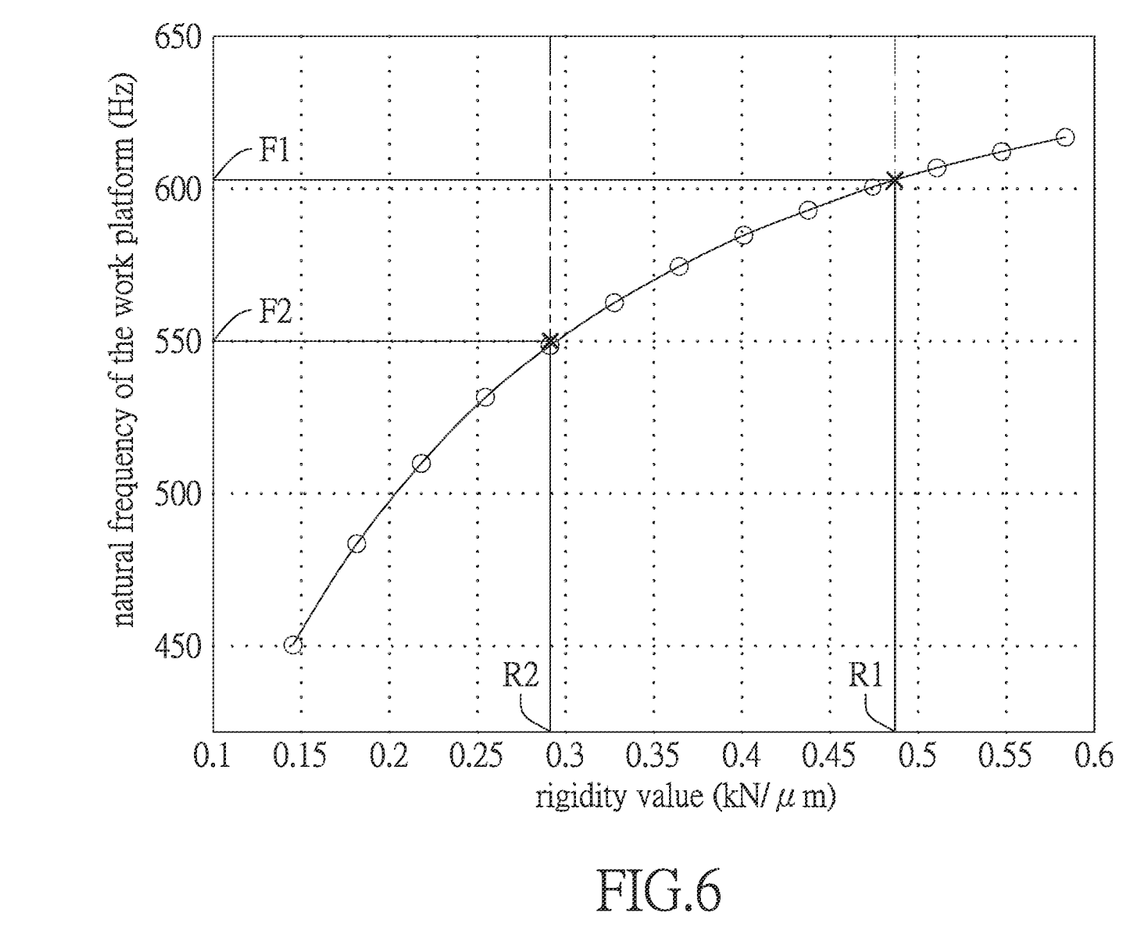
FIG. 6 is a graph showing the relationship between the natural frequencies of the work platform and the rigidity values of the slider according to an embodiment of the present invention.

Take the detectors 11A-11D as an example. Since the wear degrees of the sliders 242A-242D of the two linear guideways 24 all are not the same after a period of operation, based on the determination result of whether the set of monitoring eigenvalues corresponding to each detector 11 is similar to the corresponding set of standard eigenvalues in step S24, it can be preliminarily determined that at least one of the sliders 242A to 242D has a deviation in the rigidity value; likewise, based on the determination result of whether the set of monitoring eigenvectors corresponding to each detector 11 is similar to the corresponding set of standard eigenvectors in step S24, it can be more accurate to determine which of the sliders 242A to 242D has a deviation in the rigidity value. FIG. 6 shows the relationship curve of natural frequency to the rigidity value of the slider, wherein the longitudinal axis represents different natural frequencies of the work platform 22, and the horizontal axis represents different rigidity values of the slider, and each natural frequency corresponds to a rigidity value. The rigidity value R1 corresponding to the natural frequency F1 is the rigidity value of the high-preloaded slider just after leaving form the factory. The rigidity value R2 corresponding to the natural frequency F2 (that is, the monitoring threshold value M) is the rigidity value of the slider losing the preload. The correlation between the natural frequency and the rigidity value of the slider is stored in the database 141 in advance.

In step S24 in this example, if the set of monitoring eigenvalues and the set of monitoring eigenvectors corresponding to each of the detectors 11A-11D are not similar to the set of standard eigenvalues and the set of standard eigenvectors corresponding to this detector 11, it means that the sets of monitoring eigenvalues corresponding to all the detector 11 are all less than the natural frequency F1, and the rigidity values of the sliders 242A-242D corresponding to the detectors 11A-11D are also all declined and lower than the rigidity value R1.

In step S26 in this example, if only the set of monitoring eigenvalues corresponding to the detector 11D is smaller than the natural frequency F2, it means that the rigidity values of the sliders 242A-242C corresponding to the detectors 11A-11C have declined, but are still greater than or equal to the rigidity value R2, and however, the rigidity value of the slider 242D corresponding to the detector 11D has declined to be lower than the rigidity value R2. The declining range to the rigidity value of the slider 242D has exceeded the allowable range, so the slider 242D has already been in an abnormal state. At this time, the abnormality determination unit 135 will generate an abnormal signal corresponding to the slider 242D. In this way, any abnormal component(s) can be quickly found.

On the other hand, if the monitoring information obtained at each time point (that is, each set of monitoring eigenvalues, each set of monitoring eigenvectors and their inspection results obtained each time) can be displayed on an user interface (not shown) communicating with the processor 13, the supervisor can handle the states of the sliders 242A-242D at each time point in real time, so that when a slider 242 (such as the slider 242D) is abnormal, the abnormal slider 242D can be replaced instantly. In addition, through the above steps S24-S27 and S29, not only can the supervisor know that at least one of the sliders 242A-242D installed on the work platform 22 is damaged and needs to be replaced, but the supervisor is also allowed to accurately know which slider 242 needs to be replaced. This user interface can be displayed on a display electrically connected to the server 10 and on a display of a computer device remotely linked to the server 10. In this way, the purpose of near-end and far-end monitoring can be achieved.

Although the foregoing embodiments use two linear guideways 24 as components to be inspected, these embodiments are not intended to limit the present invention. In other embodiments, the ball screw 23 can also be used as the component to be inspected; in step S11, the screw rod 231 is selected as the reference target for establishing a digital twin model, and the rigidity value range of the nut 232 (that is, the subcomponent) and the size data, material data and position data of the screw rod 231 that are pre-stored in the database 41 are used to establish the digital twin model and calculate a set of first initial eigenvalues and a set of first initial eigenvectors of the digital twin model; and then through steps S12-S15 and steps S21-28, the changes in the rigidity value of the nut 232 can be monitored in real time, wherein the detector 11 is installed on the nut 232.

In addition, the digital twin models established above can also be applied to feeding systems of different specifications, and the method for inspecting the deviation of the dynamic characteristics of the feeding system provided by the present invention can also be applied to the feeding systems of different specifications.

Although the present invention is disclosed in the foregoing embodiments, these embodiments are not intended to limit the present invention. Without departing from the spirit and scope of the present invention, all modifications and combinations of various implementation modes are within the scope of patent protection of the present invention. For the scope of protection defined by the present invention, please refer to the attached claims.

What is claimed is:

1. A system for inspecting deviation in dynamic characteristics of a linear transmission device of a feeding system, the a subcomponent, and the system for inspecting the deviation in the dynamic characteristics of the linear transmission device of the feeding system, comprising:
   a detector, configured to be disposed on the subcomponent;
   an excitation device, configured to vibrate the feeding system;
   a database, configured to store a digital twin model that is established for the linear transmission device and includes a set of standard eigenvalues and a set of standard eigenvectors generated in an initial mode, and a set of first initial eigenvalues and a set of first initial eigenvectors generated when the linear transmission device has not been installed in the feeding system yet, and the initial mode being a stage where the linear transmission device is new and is assembled to the feeding system that has not yet entered into a monitoring mode; and a processor, configured to communicate with the detector, the excitation device and the database, the processor configured to operate in the initial mode and the monitoring mode;

wherein the processor in the initial mode performs the following steps:
  (A) controlling the excitation device to excite the feeding system and controlling the detector to detect vibration of the subcomponent to generate an initial excitation signal;
  (B) calculating, by a modal analysis method, a set of second initial eigenvalues and a set of second initial eigenvectors of the initial excitation signal; and
  (C) estimating, by an optimization method, the set of standard eigenvalues and the set of standard eigenvectors according to the set of first initial eigenvalues, the set of first initial eigenvectors, the set of second initial eigenvalues and the set of second initial eigenvectors, and storing the set of standard eigenvalues and the set of standard eigenvectors in the database;

wherein the processor in the monitoring mode performs the following steps:
  (E) controlling the excitation device to excite the feeding system and controlling the detector to detect vibration of the subcomponent to generate a monitoring excitation signal;
  (F) calculating a set of monitoring eigenvalues and a set of monitoring eigenvectors of the monitoring excitation signal by the modal analysis method;
  (G) determining, by a modal verification method, similarity between the set of monitoring eigenvalues and the set of standard eigenvalues and similarity between the set of monitoring eigenvectors and the set of standard eigenvectors; and
  (H) determining that dynamic characteristics of the subcomponent are deviated, for sensing abnormality of the subcomponent when the set of monitoring eigenvalues and the set of monitoring eigenvectors are not similar to the set of standard eigenvalues and the set of standard eigenvectors, respectively; and wherein the linear transmission device is a linear guideway or a ball screw, the subcomponent is a rail or a slider movably sleeved on the rail when the linear transmission device is the linear guideway, and the subcomponent is a screw rod or a nut movably sleeved on the screw rod when the linear transmission device is the ball screw.

2. The system for inspecting the deviation in the dynamic characteristics of the linear transmission device of the feeding system as claimed in claim 1, wherein the step (C) is performed by the following formula:

$$\min\left[\left(\frac{\hat{\omega}_n - \omega_n}{\omega_n}\right)^2 + (\Delta MAC_n)\right] \to 0$$

wherein $\hat{\omega}_n$ is a $n^{th}$ first initial eigenvalue in the set of first initial eigenvalues; $\omega_n$ is a $n^{th}$ second initial eigenvalue in the set of second initial eigenvalues; $\Delta MAC_n$ is similarity between the $n^{th}$ first initial eigenvector in the set of first initial eigenvectors and the $n^{th}$ second initial eigenvector in the set of second initial eigenvectors and is calculated by a modal reliability criterion, and n is a positive integer.

3. The system for inspecting the deviation in the dynamic characteristics of the linear transmission device of the feeding system as claimed in claim 1, wherein the processor in the monitoring mode further performs the following steps:
  (I) determining whether the set of monitoring eigenvalues is smaller than a monitoring threshold; and
  (J) determining that the subcomponent corresponding to the detector is abnormal, when the set of monitoring eigenvalues is less than the monitoring threshold value.

4. The system for inspecting the deviation in the dynamic characteristics of the linear transmission device of the feeding system as claimed in claim 1, wherein when the set of monitoring eigenvalues and the set of monitoring eigenvectors are not similar to the set of standard eigenvalues and the set of standard eigenvectors, respectively, the processor further performs the following step in the monitoring mode:
  (K) updating, by an optimization method, the set of standard eigenvalues and the set of standard eigenvectors according to the set of monitoring eigenvalues and the set of monitoring eigenvectors, and defining the updated set of standard eigenvalues and the updated set of standard eigenvectors as updated dynamic characteristics of the digital twin model.

5. The system for inspecting the deviation in the dynamic characteristics of the linear transmission device of the feeding system as claimed in claim 1, wherein the modal analysis method is an experimental modal analysis method or an operational modal analysis method.

6. The system for inspecting the deviation in the dynamic characteristics of the linear transmission device of the feeding system as claimed in claim 1, wherein the feeding system is excited in a knock or motor-driven manner.

7. The system for inspecting the deviation in the dynamic characteristics of the linear transmission device of the feeding system as claimed in claim 1, wherein the dynamic characteristics of the subcomponent include mass, damping or rigidity.

* * * * *